(12) United States Patent
Lee et al.

(10) Patent No.: US 7,535,198 B2
(45) Date of Patent: May 19, 2009

(54) SWITCHING CIRCUIT FOR BALANCING OF BATTERY CELL'S VOLTAGE BASED ON INTERRUPTING BALANCING CURRENT

(75) Inventors: Dal Hoon Lee, Seoul (KR); Han Ho Lee, Daejeon (KR); Jee Ho Kim, Daejeon (KR); Eguchi Yasuhito, Ebina (JP)

(73) Assignee: LG Chem, Ltd. (KR)

( * ) Notice: Subject to any disclaimer, the term of this patent is extended or adjusted under 35 U.S.C. 154(b) by 375 days.

(21) Appl. No.: 11/404,286

(22) Filed: Apr. 14, 2006

(65) Prior Publication Data

US 2007/0090799 A1 Apr. 26, 2007

(30) Foreign Application Priority Data

Apr. 15, 2005 (KR) .................. 10-2005-0031293

(51) Int. Cl.
*H01M 10/46* (2006.01)
(52) U.S. Cl. ....................................... 320/118
(58) Field of Classification Search ................ 320/107, 320/110, 116, 118, 119, 134, 136
See application file for complete search history.

(56) References Cited

U.S. PATENT DOCUMENTS

| 5,656,915 A | * | 8/1997 | Eaves | 320/118 |
| 6,150,795 A | * | 11/2000 | Kutkut et al. | 320/118 |
| 6,873,134 B2 | * | 3/2005 | Canter et al. | 320/118 |

* cited by examiner

*Primary Examiner*—Edward Tso
(74) *Attorney, Agent, or Firm*—Cantor Colburn LLP

(57) ABSTRACT

Disclosed is a switching circuit for balancing battery cells. The switching circuit includes plural pairs of switching means, each pair of which are connected to each other in parallel and interrupt a flow of electric current in a bi-direction in order to reduce the internal voltage applied to the switching means. According to the present invention, since the switching elements of low internal voltage can be used for the switching circuit, it is possible to constitute the switching circuit for cell balancing without use of switching elements of high internal voltage and to reduce the number of MOSFETs, thereby making it possible to design the switching circuit effectively. Since the MOSFETs having the low internal voltage and low resistance are used for the switching circuit, it is possible to reduce a loss of the electric current due to the resistance during the cell balancing, thereby improving the balancing efficiency and reducing heat generation.

5 Claims, 10 Drawing Sheets internal voltage 2∗Bv   internal voltage Bv

SWITCHING CIRCUIT FOR BALANCING OF BATTERY CELL'S VOLTAGE BASED ON INTERRUPTING BALANCING CURRENT

This application claims the benefit of Korean Patent Application No. 10-2005-0031293, filed on Apr. 15, 2005 in Korea Industrial Property Office, which is hereby incorporated by reference in its entirety for all purposes as if fully set forth herein.

BACKGROUND OF THE INVENTION

1. Field of the Invention

The present invention relates to a switching circuit for balancing battery cells, and more particularly to a switching circuit for interrupting balancing current.

2. Description of the Prior Art

There are various methods of balancing cells of lithium ion battery. The most used one among the various methods is to apply an electric current to a battery cell having a relatively high voltage in a discharge direction, so as to balance battery cells.

Typically, a method of applying electric current to a resistor, etc. is merely used to balance battery cells. However, in this method, electric power is greatly wasted. Therefore, this method is used for a system consuming a small amount of electric power. Further, there is another method using a DC-DC converter. Generally, this method has a high efficiency and a low heating value.

However, since it is impossible for a battery to have an efficiency of 100%, there is a problem in that the total voltage of the battery cell may be lowered below the original minimum voltage due to the balancing of the battery cells when the number of battery cells having a low voltage increases. In addition, the cells may be efficiently balanced by combining charging current and discharging current.

General balancing control circuits have an independent balance electric source (including resistor, etc.) disposed in each battery cell so as to allow electric current for balancing to flow, and alternately provide the balancing current to various cells in a manner of time division.

FIG. 1 is the block diagram illustrating the structure of a conventional balancing control circuit. The conventional balancing control circuit will be described with reference to FIG. 1.

Terminal voltages of cells B1, B2, B3 and B4 of a lithium ion battery are selected by a line selector 10, and then provided through a ground shift 20 to a central processing unit (CPU) 30. An analog to digital converter (A/D converter) embedded in a CPU 30 A/D converts the analog terminal voltages into digital data, so that they become readable as digital data.

The CPU 30 compares voltage data of the cells B1, B2, B3 and B4 of the lithium ion battery with one another, so as to obtain differences between the values of the voltage data. If the differences are greater than a prescribed value, it is determined that balances between the cells are different.

Further, the CPU 30 provides a balance control signal to a balance current controller 40 in order to balance the cells, so as to allow the balance current controller 40 to apply electric current to the cells to be balanced.

The balance current is applied from a balance electric source (for example D-D converter) to the cells selected by an electric current switch. Switches selecting a terminal of the battery cell are generally arranged as shown in FIG. 2. The terminals B1, B2, B3 and B4 are sequentially connected to $B_v^+$ and $B_v^-$ according to the operation of the switches.

Such an arrangement is realized by Metal Oxide Silicon Field Effect Transistors (MOSFETs) having a parasitic diode, as shown in FIG. 3.

At this time, the MOSFETs S2, S3, S6 and S7 need to interrupt the bi-directional flow of electric current, and each MOSFET is disposed between drains (or sources) so as to connect the drains (or sources) to each other, thereby preventing the flow of the current caused by the parasitic diode.

In this case, a dozen MOSFETs are required.

Further, in consideration of voltage applied to MOSFETs between drain and source, the maximum voltage is applied to the MOSFETs S1, S4, S5, and S8. The voltage is three times greater than the voltage of the cell. For example, assuming that the maximum voltage of each cell is about 4.5V, the sum of the voltage of three cells is about 13.5V. Since the MOSFETs having tolerance of internal voltage are generally required, MOSFETs having a voltage level of 20~30V are used.

In the conventional balance control circuit as described above, since the MOSFET must have higher internal voltage than total voltage of the battery cells, MOSFETs having high internal voltage are required and a great number of MOSFETs are needed in order to interrupt the flow of the electric current through the parasitic diode.

SUMMARY OF THE INVENTION

Accordingly, the present invention has been made to solve the above-mentioned problems occurring in the prior art, and it is an object of the present invention to provide a switching circuit for balancing cells of a lithium ion battery, which includes the reduced number of MOSFETs which is used as a switching means and has a low internal voltage, thereby reducing the manufacturing cost thereof and improving the efficiency of the MOSFETs.

In order to accomplish the object of the present invention, there is provided a switching circuit for balancing battery cells, which includes: plural pairs of switching means, each pair of which are connected to each other in parallel and interrupt a flow of electric current in a bi-direction in order to reduce internal voltage applied to the switching means.

Further, the switching means includes a Metal Oxide Silicon Field Effect Transistor (MOSFET) having a parasitic diode.

Further, the plurality of switching means has lower internal voltage than the total voltage of a battery pack.

DETAILED DESCRIPTION OF THE PREFERRED EMBODIMENTS

Hereinafter, a preferred embodiment of the present invention will be described with reference to the accompanying drawings.

Figure 1:
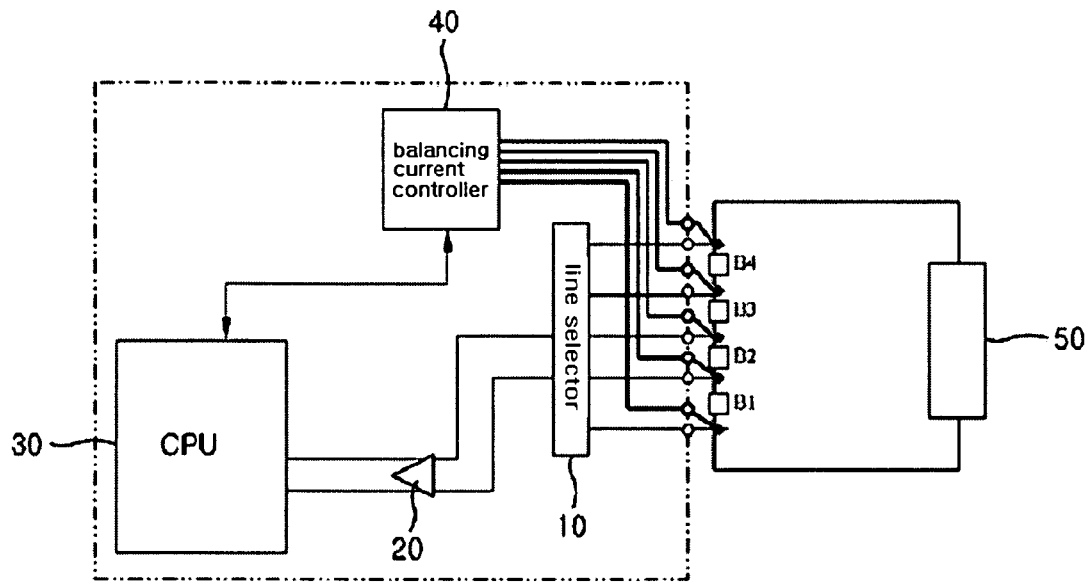
FIG. 1 is a block diagram illustrating a conventional switching circuit for balancing battery cells.
Figure 2:
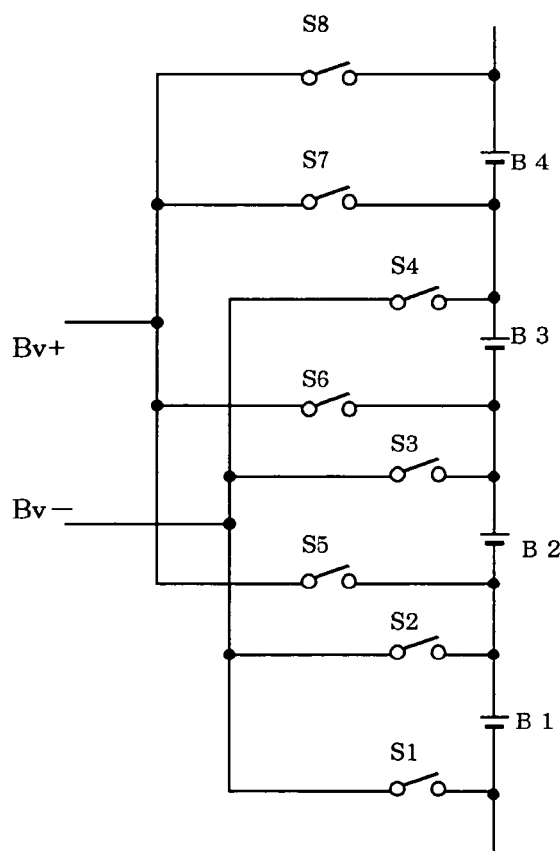
FIG. 2 is a circuit diagram of the conventional switching circuit for balancing the battery cells.
Figure 3:
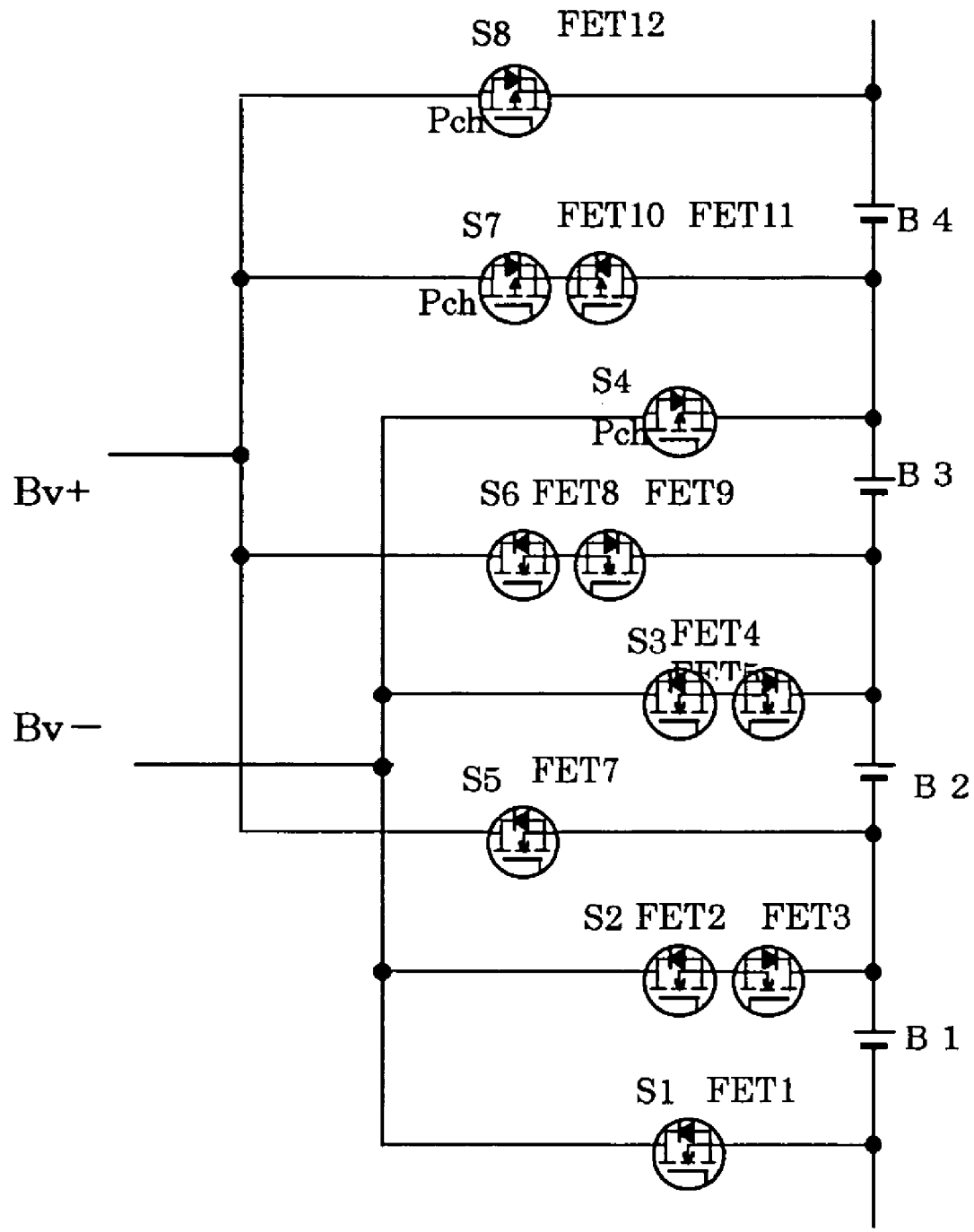
FIG. 3 is a circuit diagram of the conventional MOSFET switching circuit for balancing battery cells.
Figure 4:
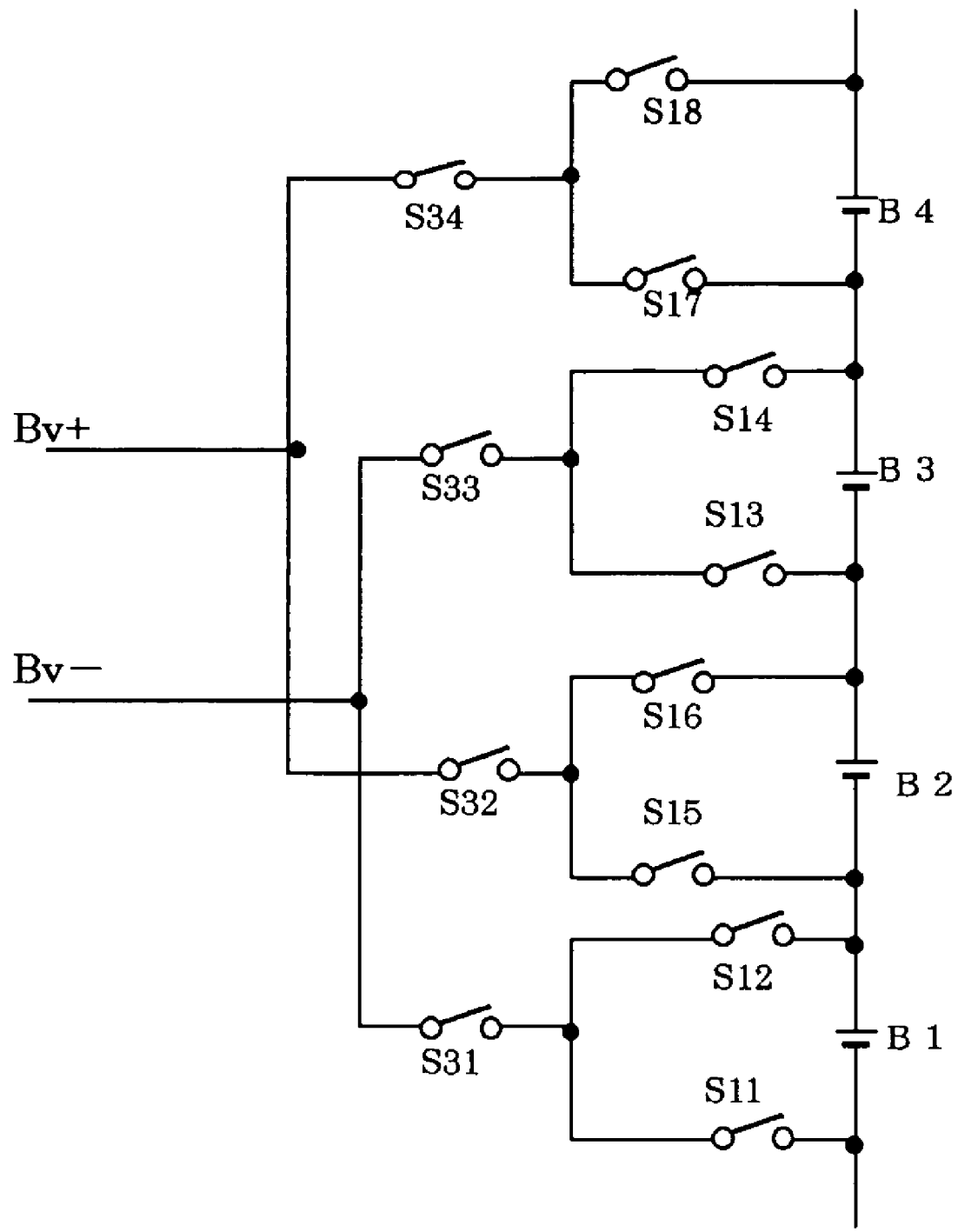
FIG. 4 is a circuit diagram of a switching circuit according to an embodiment of the present invention.

FIG. 4 is a circuit diagram of a switching circuit for switching four battery cells, according to an embodiment of the present invention.

A dozen opening/closing switches are entirely required for $B_v^+$ and $B_v^-$. Specifically, the switches S2, S3, S6 and S7 are replaced by switches S11 and S12, switches S15 and S16, switches S13 and S14, and switches S17 and S18, respectively, which are connected in parallel so as to form a circuit.

In the circuit, the total number of opening/closing switches increases somewhat, but switches having lower internal voltage than the total voltage of battery cells may be used.

Figure 5:
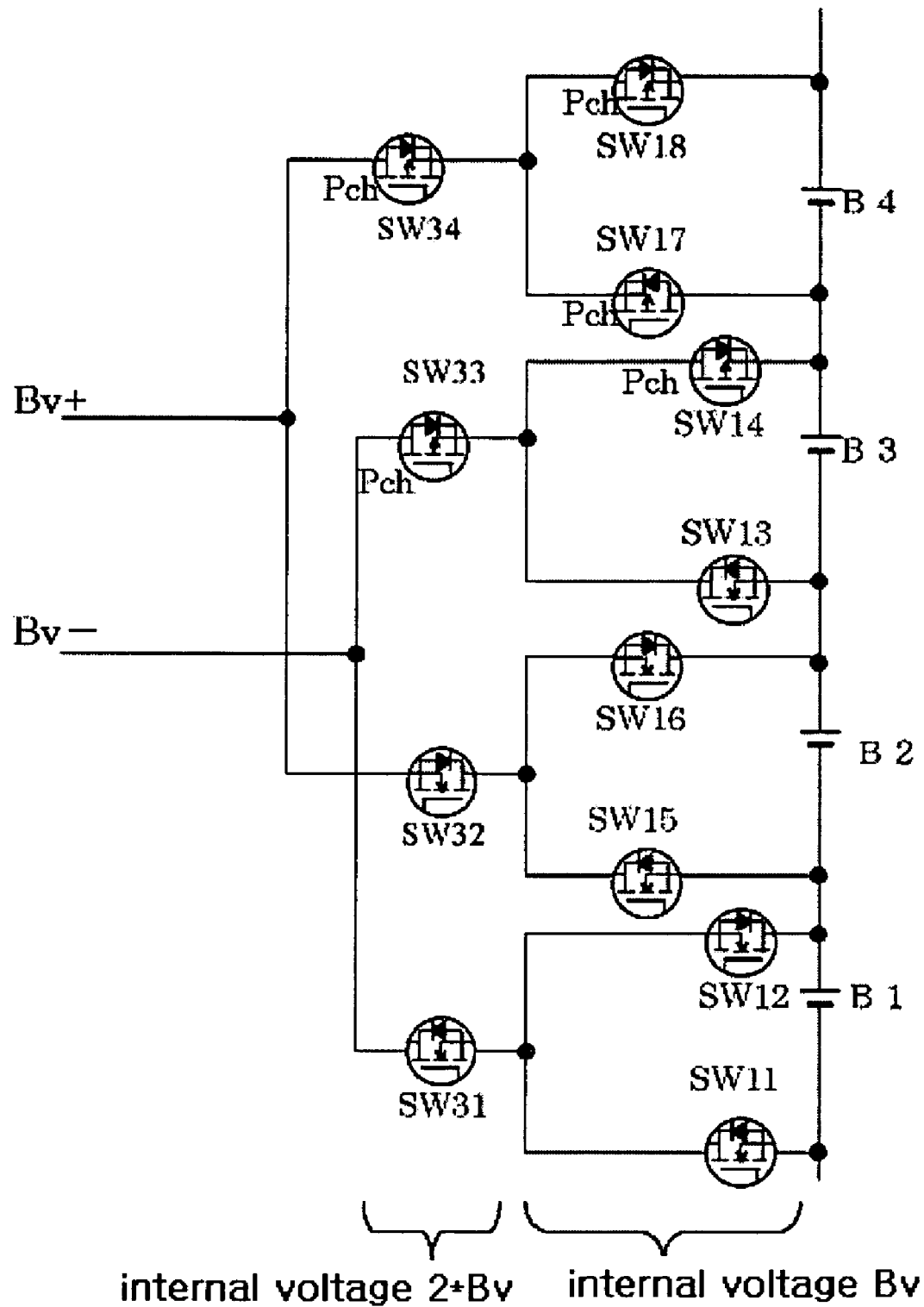
FIG. 5 is a circuit diagram of a MOSFET switching circuit according to the embodiment of the present invention.

FIG. 5 is a circuit diagram of an opening/closing switch including MOSFET with a parasitic diode. In this case, since the switching circuit should have a function of interrupting one directional electric current, the total number of opening/closing switches is equal to the number of MOSFETs.

In the case of suitably arranging each MOSFET, the voltage applied to each MOSFET is about $2*B_v$, and the internal voltage of each MOSFET is equal to the sum of the voltage of two cells, i.e. 9V.

In FIG. 5, the internal voltage is represented which is required for the switching circuit for selecting a battery cell according to the present invention.

Specifically, the internal voltage required for the switches SW11, SW12, SW13, SW14, SW15, SW16, SW17 and SW18 is $B_v$, and the internal voltage required for the switches SW31, SW32, SW33, and SW34 is $2*B_v$.

Figure 6:
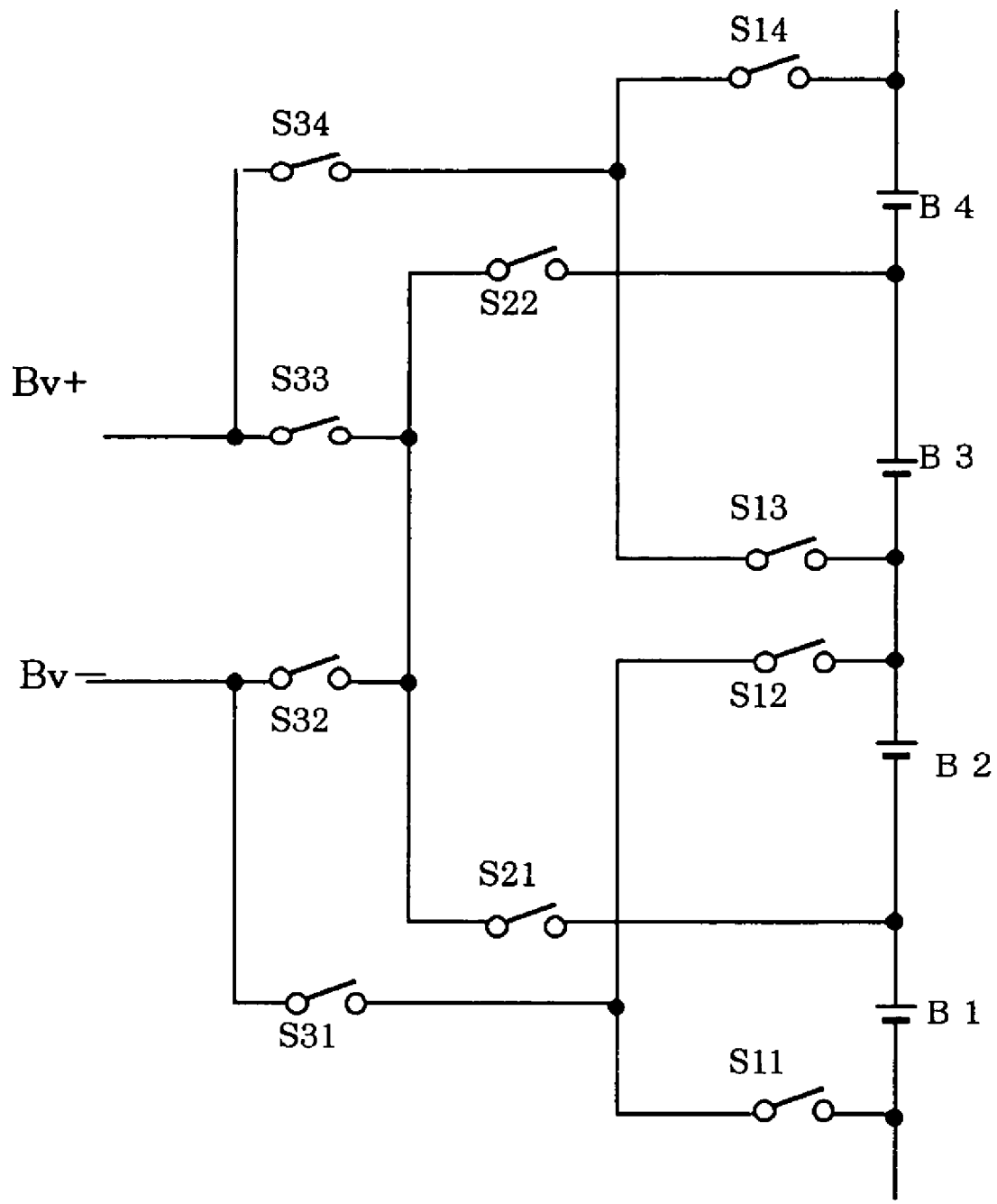
FIG. 6 is a circuit diagram of a switching circuit according to another embodiment of the present invention.

FIG. 6 is a circuit diagram of a switching circuit according to another embodiment of the present invention.

In the present embodiment, a dual MOSFET package is used. Identical numerals are used to depict the MOSFETs and the switches.

The opening/closing switches in FIG. 6 are improved so that the switches for $B_v^+$ and the switches for $B_v^-$ are partially used in common, thereby reducing the number of the switches.

Figure 7:
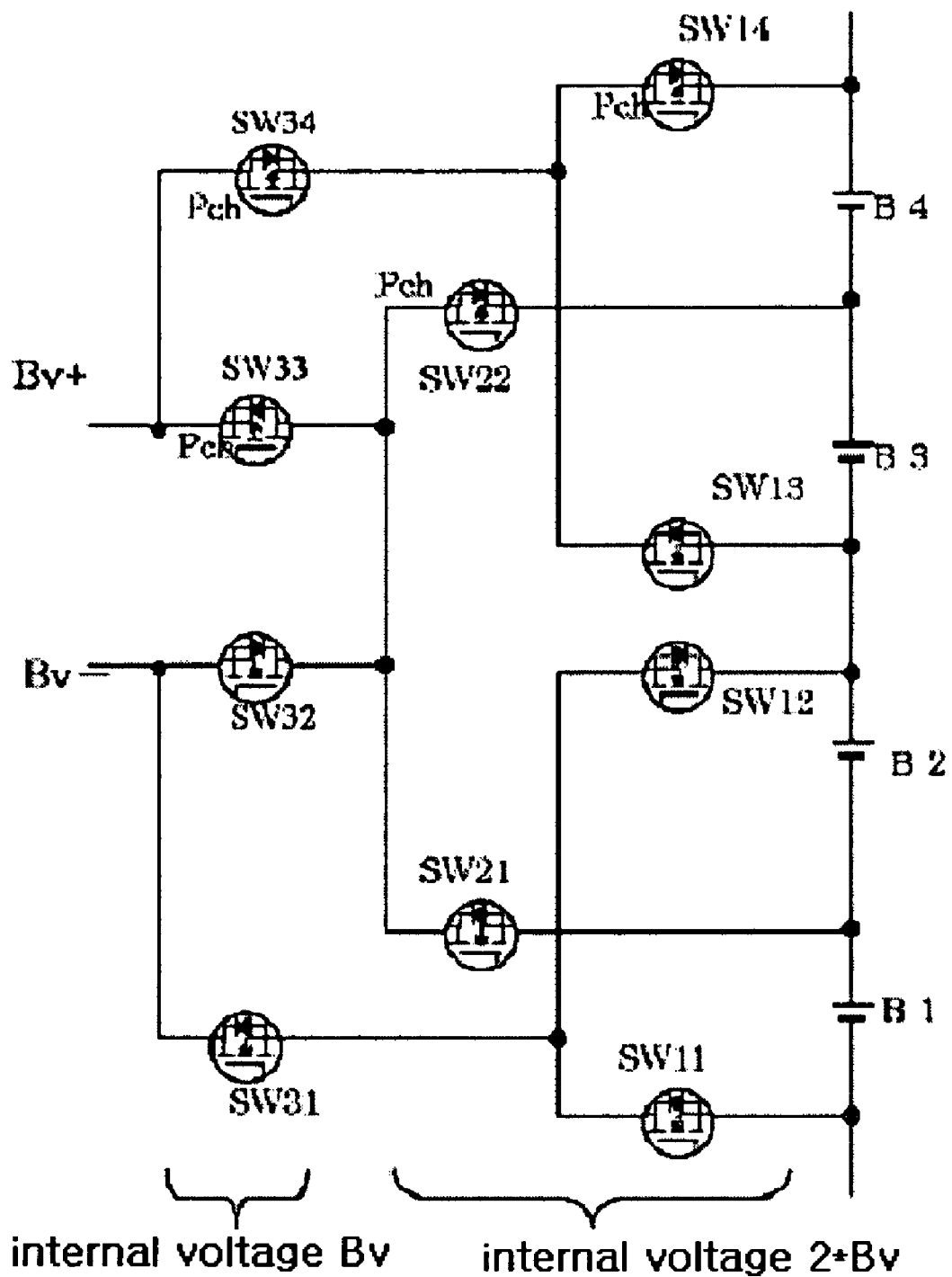
FIG. 7 is a circuit diagram of a MOSFET switching circuit according to another embodiment of the present invention.

FIG. 7 is a circuit diagram of a switching circuit according to another embodiment of the present invention, in which MOSFETs having parasitic diodes are used as opening/closing switches.

In FIG. 7, the internal voltage is represented which is required for the switching circuit. The internal voltage required for the switches SW11, SW12, SW13, SW14, SW21, and SW22 is $2*B_v$, and the internal voltage required for the switches SW31, SW32, SW33, and SW34 is $B_v$.

Hereinafter, in the case where eight battery cells are connected in series, internal voltage and the number of elements will be described.

Figure 8:
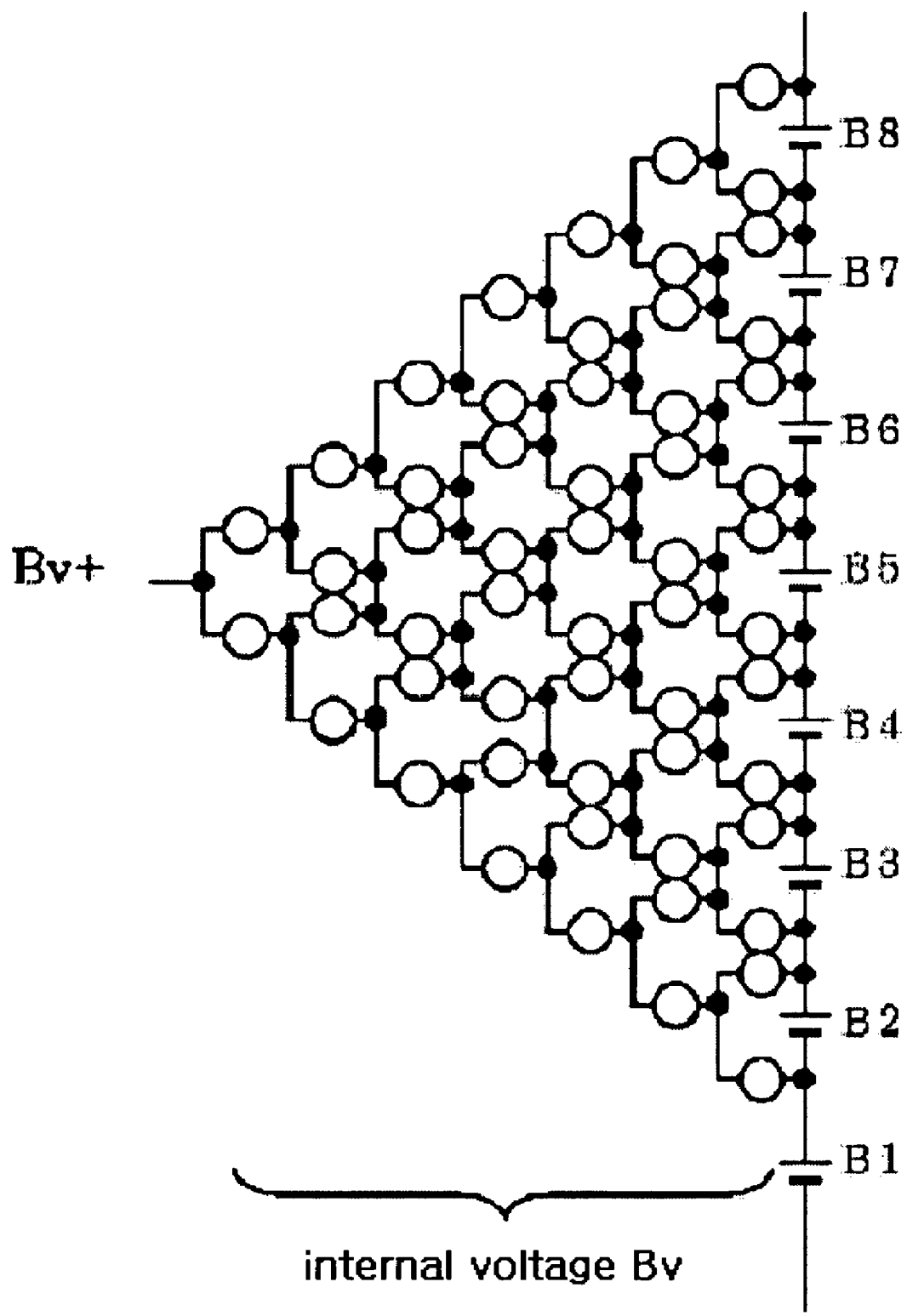
FIG. 8 is a circuit diagram of a switching circuit according to still another embodiment of the present invention.

FIG. 8 is a circuit diagram of a switching circuit according to still another embodiment of the present invention, in which the internal voltage of the elements is $B_v$.

When the elements having the minimum internal voltage are used, the number of switching elements increases. In the present embodiment, only the switching elements connected to $B_v^+$ are shown, and fifty-six switching elements are used for the switch circuit. If the switching elements connected to $B_v^-$ are added, one hundred-twelve switching elements are used for the switch circuit. Although the switch circuit includes a great number of switches, it is useful to use the elements of low internal voltage for Integrated Circuit (IC).

Figure 9:
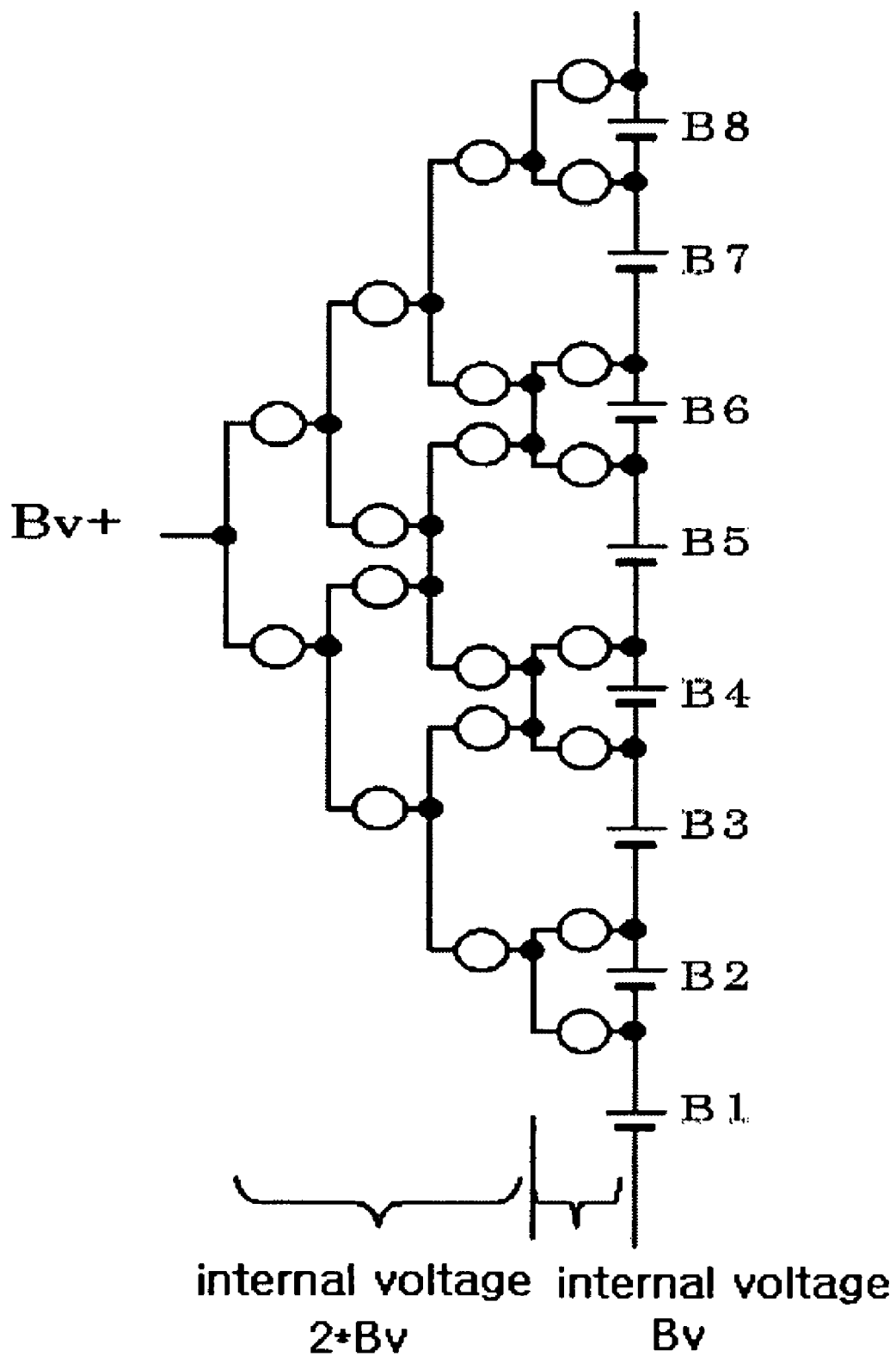
FIG. 9 is a circuit diagram of a switching circuit according to still another embodiment of the present invention.

On the other hand, FIG. 9 is a circuit diagram of a switching circuit according to still another embodiment of the present invention, in which the internal voltage of the switching element is $2*B_v^+$. If the internal voltage of the switching element is set to $2*B_v^+$, the number of the switching elements can be reduced. That is, forty switching elements can be used for both of $B_v^+$ and $B_v^-$.

Figure 10:
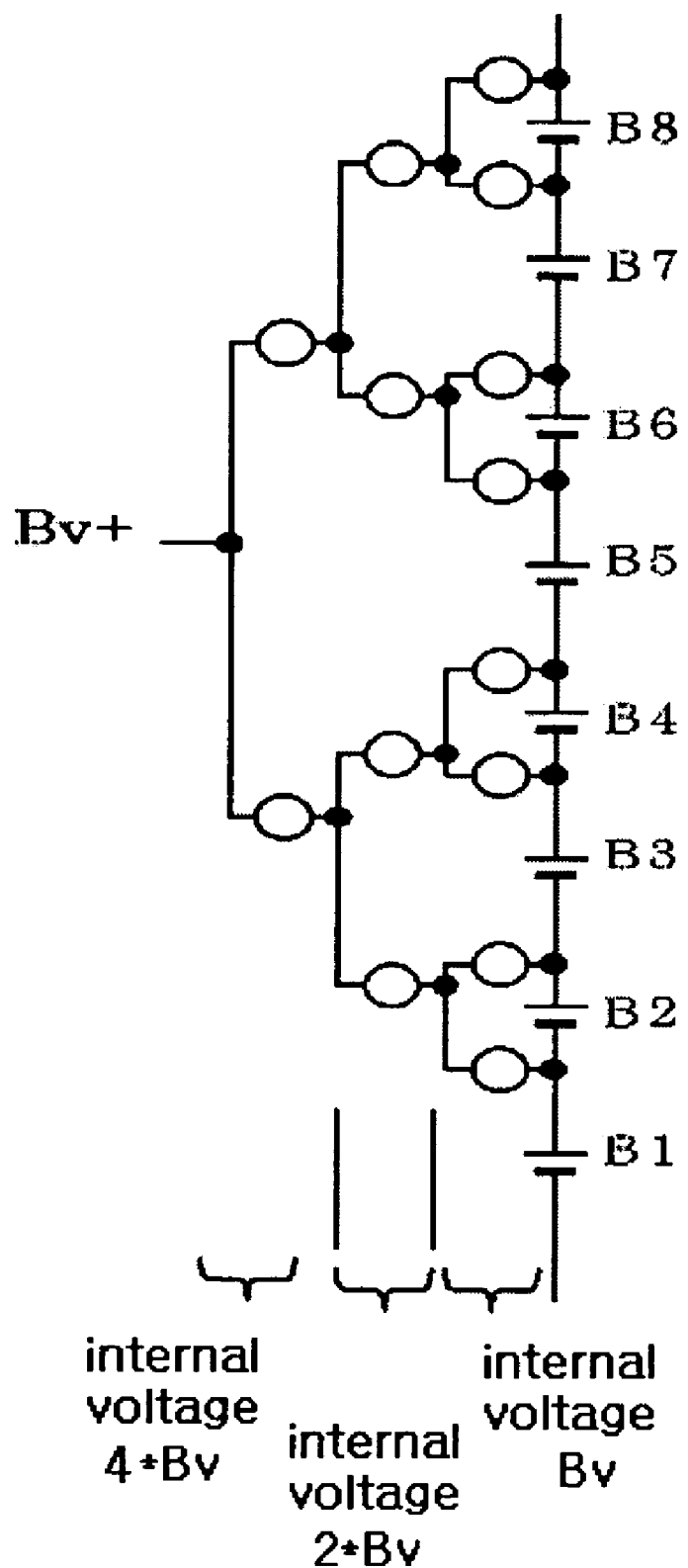
FIG. 10 is a circuit diagram of a switching circuit according to still another embodiment of the present invention.

FIG. 10 is a circuit diagram of a switching circuit according to still another embodiment of the present invention, in which switching elements having an internal voltage of $4*B_v$ is used. Twenty-eight switching elements are used for both of $B_v^+$ and $B_v^-$.

In the present embodiment, since two bundles of four battery cell modules are connected in series and eight units are connected to each battery cell, a switching element having an internal voltage of $4*B_v$ need to be used for an auxiliary switch.

As described above, the switching elements of high internal voltage are effectively used, and thereby it is possible to reduce the great number of switching elements.

Figure 11:
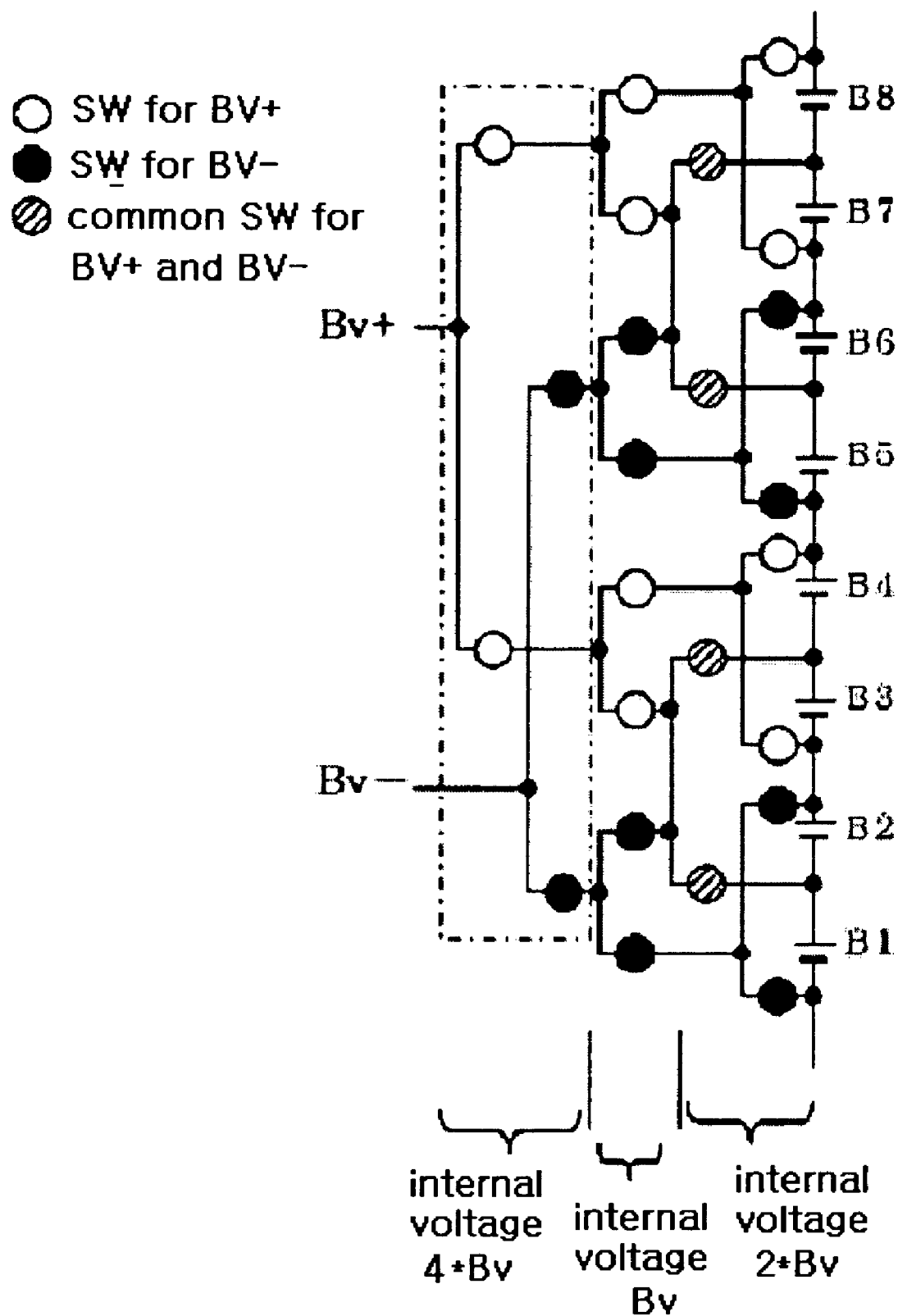
FIG. 11 is a circuit diagram of a switching circuit according to still another embodiment of the present invention.

FIG. 11 is a circuit diagram of a switching circuit according to still another embodiment of the present invention, in which twenty-eight switching elements are used and are classified into the switching elements used for $B_v^+$, the switching elements used for $B_v^-$, and the common switching elements used for both of $B_v^+$ and $B_v^-$.

In the case of eight battery cells, when the switching circuit is formed according to the conventional method, the switching elements require the internal voltage of $7*B_v$ (about 32V). When the switching elements having high internal voltage are turned on, its resistance increases and causes the scale-up of the switching elements.

According to the present invention, however, the switching elements are merely arranged in hierarchical structure. Thus, the switching elements having low internal voltage can be used in comparison with the total voltage of the battery cells, thereby reducing their resistance and miniaturizing the size thereof.

As described above, since the present invention can use the switching elements having low internal voltage and low resistance, it is possible to reduce a loss of the electric current due to the resistance during the cell balancing, thereby improving the balancing efficiency and reducing heat generation.

Further, the switching elements of low internal voltage have a little resistance and a small size as compared with other elements, thereby making it possible to miniaturize the battery.

Furthermore, it is possible to reduce the number of the switching elements, thereby miniaturizing the battery and reducing the manufacturing cost of the battery.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A switching circuit for balancing battery cells, comprising:
    plural pairs of switching means arranged in a hierarchical structure, each pair of which comprises switching means connected to each other in parallel and interrupt a flow of electric current in a bi-direction in order to reduce internal voltage applied to the switching means.

2. A switching circuit for balancing battery cells, comprising:
    plural pairs of switching means arranged in a hierarchical structure, each pair of which comprises switching means connected to each other in parallel and interrupt a flow of electric current in a bi-direction in order to reduce the number of the switching means.

3. The switching circuit for balancing battery cells as claimed in claim 1, wherein the switching means includes a Metal Oxide Silicon Field Effect Transistor (MOSFET) having a parasitic diode.

4. The switching circuit for balancing battery cells as claimed in claim 2, wherein the switching means includes a Metal Oxide Silicon Field Effect Transistor (MOSFET) having a parasitic diode.

5. The switching circuit for balancing battery cells as claimed in claim 1, wherein the plurality of switching means has lower internal voltage than the total voltage of a battery pack.

* * * * *